United States Patent
Maropis

[11] 3,807,257
[45] Apr. 30, 1974

[54] APPARATUS AND METHOD FOR DELIVERING VIBRATORY ENERGY

[75] Inventor: Nicholas Maropis, West Chester, Pa.

[73] Assignee: The United States of America as represented by the United States Atomic Energy Commission, Washington, D.C.

[22] Filed: Nov. 17, 1972

[21] Appl. No.: 307,674

[52] U.S. Cl............. 82/1 C, 82/DIG. 9, 29/470.1, 408/1, 408/124, 51/DIG. 11
[51] Int. Cl............................................. B23b 1/00
[58] Field of Search............. 82/1 C, DIG. 9, 36 R; 408/1, 124; 29/470.1; 310/8.7, 26; 90/11; 51/58, DIG. 11

[56] References Cited
UNITED STATES PATENTS

| | | | |
|---|---|---|---|
| 3,466,970 | 9/1969 | Jones | 90/11 R |
| 3,257,721 | 6/1966 | Jones | 29/470.1 |
| 3,640,180 | 2/1972 | Maropis | 90/11 R |

Primary Examiner—Leonidas Vlachos
Attorney, Agent, or Firm—John A. Horan; David S. Zachry; L. M. Deckelmann

[57] ABSTRACT

Apparatus and method have been provided for effectively transmitting vibratory energy to a cutting tool for carrying out I.D. machining and boring operations. To be effective in aiding I.D. cutting operations, the preferred mode of vibratory energy to be transmitted to the cutting tool is the torsional mode whereby the tool movement is in an arcuate path of radius less than the radius of the surface to be machined. A tool holding and locking mechanism is provided for effective transmission of ultrasonic energy to the cutting tool.

2 Claims, 5 Drawing Figures

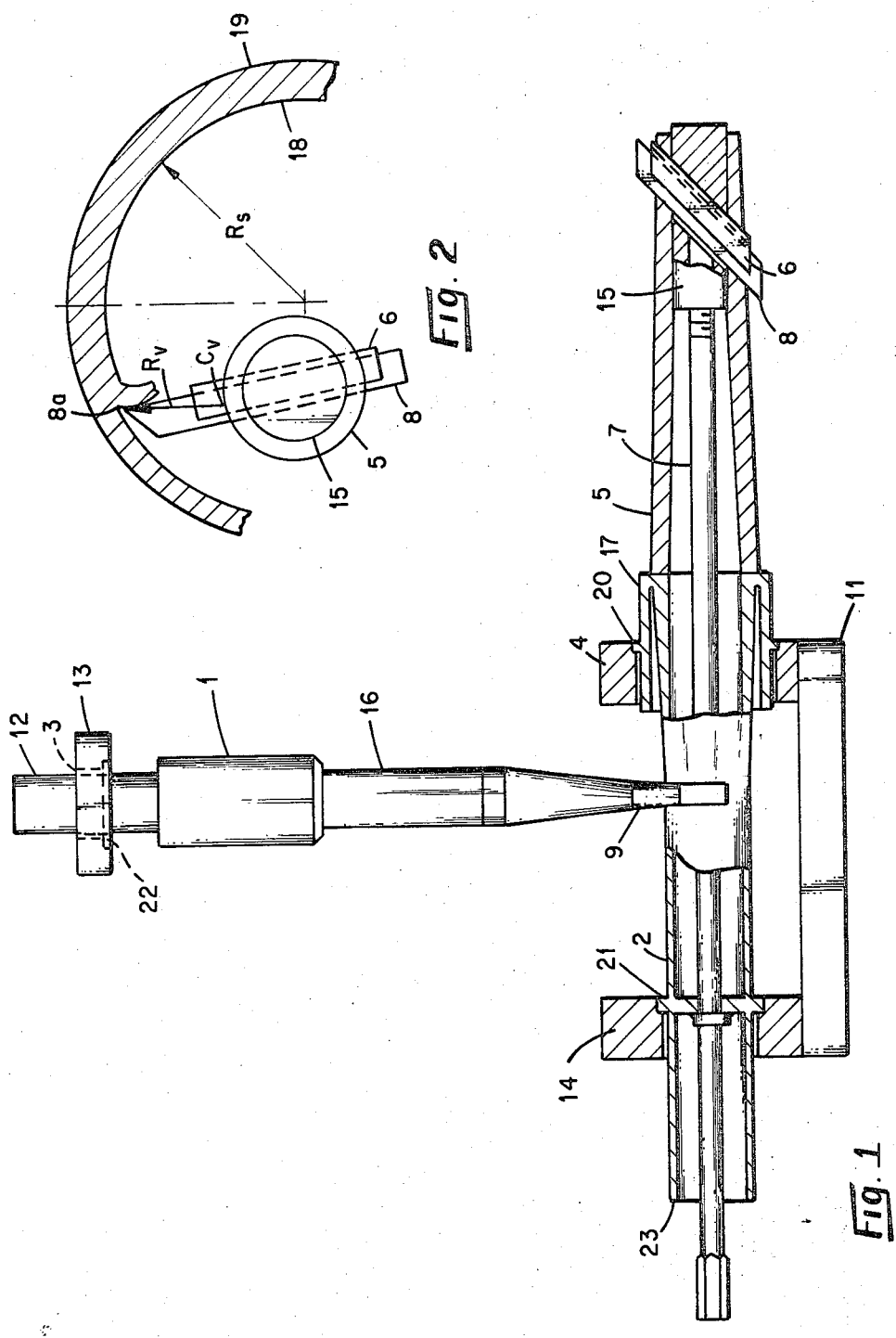

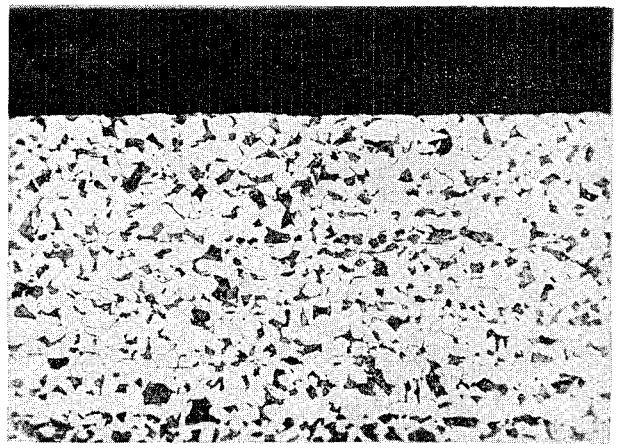
ULTRASONIC
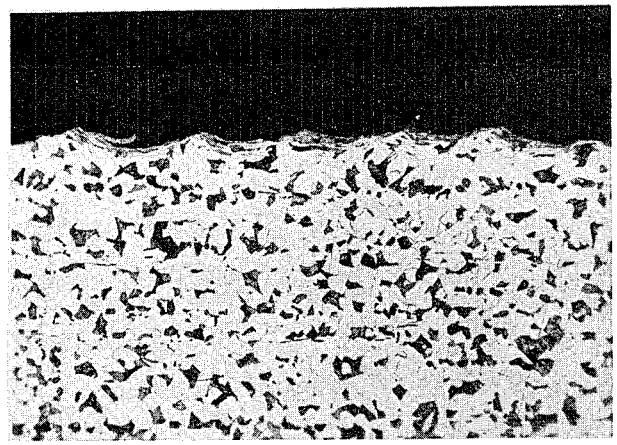
NON-ULTRASONIC
*Fig. 5*

APPARATUS AND METHOD FOR DELIVERING VIBRATORY ENERGY

BACKGROUND OF THE INVENTION

This invention was made in the course of, or under, a contract with the United States Atomic Energy Commission.

It has been proposed in the prior art to apply vibratory motion to a machine cutting tool to aid in metal cutting operations wherein the outside dimensions of a workpiece are reduced. The prior art (U.S. Pat. No. 3,466,970 and its continuation-in-part application, Ser. No. 29,588) teaches that the cutting tool must be vibrated so that vibratory motion is in the plane and direction of the cut and relies on axial vibration of or axial-to-flexural vibratory mode conversion at the cutting tool. While apparatus of the type disclosed is easily adapted to O.D. machining operations, the technique cannot be directly applied to the turning of inside diameters since the extremes of the vibratory excursions would not be outside of and free of the surface of the metal being turned but rather would interfere with and increase the depth of cut on the I.D. bore. It follows therefore that the cutting tool must excursion in an arcuate path within the I.D. bore, said arcuate path to have a radius less than the radius of the surface to be machined. In such I.D. machining operations there exists a need for means for transmitting the vibratory energy from an acoustic transducer or transducers to cause vibratory motion of the cutting tool in the required manner. The present invention was conceived to meet this need in a manner to be described hereinbelow.

SUMMARY OF THE INVENTION

It is the object of the present invention to provide method and apparatus for effective delivery of vibratory energy to a cutting tool in an I.D. machining operation. The above object has been accomplished in the present invention by providing means for causing arcuate vibratory motion of the cutting edge maintained in contact with the I.D. surface to be machined. Briefly stated, axial mode vibratory drive is provided essentially tangent to a torsionally resonant wave guide-tool clamping device, converting the axial vibratory motion into torsional vibratory motion, which is thence transmitted to the cutting tool where mode conversion again occurs to effect said arcuate vibratory motion of the cutting edge via flexural vibration of the tool in the manner to be described below.

BRIEF DESCRIPTION OF THE DRAWINGS

FIG. 1 is an elevation view, partly in section, illustrating the ultrasonic machining fixture for I.D. machining showing the tool locking mechanism.

FIG. 2 is a sectional view illustrating one relationship of the cutting tool of FIG. 1 with respect to a workpiece.

FIG. 5 is a photomicrograph, magnified 100X, which exhibits the pronounced difference between the ultrasonic and the conventional cuts.

DESCRIPTION OF THE PREFERRED EMBODIMENT

Figure 3:
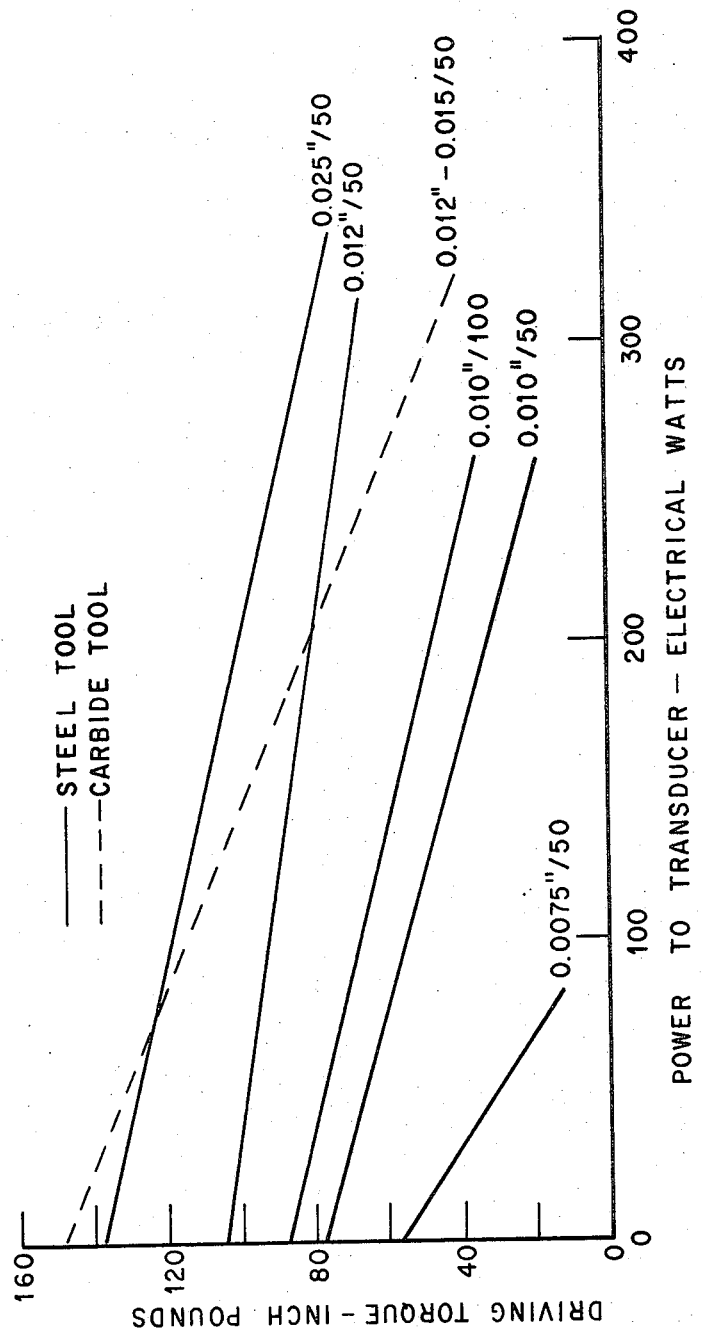
FIGS. 3 and 4 illustrate graphically the reduction in driving torque as a function of ultrasonic power.

An ultrasonically activated cutting device associated with a machine tool such as a lathe is illustrated in FIG. 1 to which reference is now made.

The cutting device comprises a means for generating vibratory energy such as the transducer array 1 having an acoustical stabilizing member 12 and an acoustical coupling member 16 which may be of the type disclosed in U.S. Pat. No. 3,283,182 titled "Transducer Assembly," issued Nov. 1, 1966, in the name of J. B. Jones et al. The disclosure of U.S. Pat. No. 3,283,182 is incorporated herein by reference. It will be recognized by those skilled in the art that other types of vibratory energy generating means, such as magnetostrictive transducers, may be suitable for the transducer array 1.

Transducer assembly 1, axial wave guide 9, and torsional wave guide 2 are employed herein as an axial-to-torsional mode converting array in accordance with mode converting techniques disclosed in U.S. Pat. No. 3,257,721 incorporated herein by reference. Briefly stated, axial mode vibratory energy of wave guide 9 is introduced into torsional wave guide 2 at a low stress area causing said torsional wave guide to vibrate in the torsional mode. Torsional horn 5 may be tapered to provide a mechanical gain factor in accordance with the above-referenced U.S. Pat. No. 3,257,721. A member 15 is slidably positioned within torsional horn 5 and is threadedly connected to drawbar 7. Member 15 and torsional horn 5 are provided with a transverse hole for receiving a clamp 6 carrying a cutting tool 8. The clamp 6 and the cutting tool 8 which it carries are pulled into position by the drawbar 7 with its affixed member 15 and thus clamped rigidly in position.

The design of the vibratory wave guide and mode-converting system of the present invention involves consideration of acoustic impedance matching between the axial wave guide 9 and the torsional wave guide 2, and between the torsional wave guide 2 and the torsional horn 5, wherein the techniques of the prior art U.S. Pat. No. 3,257,721 may be applied. The coupling between the cutting tool 8 and the torsional horn 5 is somewhat critical since the method of tool support must have high mechanical integrity to assure that it will support mechanically imposed loads without altering its position when subjected to vibratory activation, and the clamping must additionally support the tool in such a way that it will properly execute the desired vibratory motion and effectively transmit vibratory power. The use of the wedge action clamp 6 (holding tool 8) pulled into position by the torsionally resonant drawbar 7 provides for both mechanical clamping and effective acoustic coupling as mentioned hereinabove. Said clamp 6 further provides for mechanical interchangeability of tool 8 as well as adjustment of tool overhang.

Referring to FIG. 2, cutting tool 8 shown within a workpiece 19 may be slidably adjusted within clamp 6 to resonate flexurally with the ultrasonic system to vibrate flexurally in accordance with the torsional drive of torsional horn 5, or to maintain rigidity with the torsional drive frequency and operate as a lumped mass. The flexural response is preferred, but the system will function when the tool does not comply flexurally. The overhang of cutting tool 8 is the linear distance between cutting edge 8a and the outside periphery of torsional horn 5 at the clamping zone on said cutting tool and is measured parallel to the axis of said cutting tool. The arcuate vibratory path of cutting edge 8a is described at a radius $R_v$, which is less than the radius $R_s$ of the I.D. surface 18 to be machined. The center $C_v$ of arcuate vibratory motion may be located at the clamping zone on cutting tool 8 or at any nodal location, or area of minimum flexural vibratory motion, occurring along the axis of said cutting tool.

The ultrasonically activated cutting device of the present invention is preferably supported in a manner which serves to preclude the transmission of significant levels of vibratory energy to the mounting structure. For attachment of the transducer assembly 1 to an external means an embracing collar 13 preferably made of non-metallic material such as micarta is preferably removably secured as by brazing to acoustical stabilizing member 12 at radially outwardly extending flange 22 positioned at a nodal plane or plane of minimum motion approximately midway along the length of acoustical stabilizing member 12, which extends through a clearance bore 3 in the embracing collar 13.

Support of vibratory devices in the manner described immediately above, i.e., nodal-point support, is commonly utilized when the vibratory device has a free end or, in other words, an end which is not delivering energy, such that a node will exist in the vibrating member.

Such nodal-point supports are regarded by those skilled in the art to be generally unsuitable, for reasons of high energy loss to the mounting structure, for use with vibratory energy delivering members, such as impedance-matching torsional horn 5 of the present invention, and the apparatus of U.S. Pat. No. 2,891,180 is therefore relied upon for more efficient energy-delivery systems. In accordance with said patent, entitled "Support for Vibratory Devices" and incorporated herein by reference, the support, as e.g., support 17 of the present invention, comprises "a resonant member one-half wavelength long or unit multiples of one-half wavelength long according to the properties of the material of which the support is made and the operating frequency of the vibratory device with which the support is engaged. Such supports have a node one-quarter wavelength from the free end of the support, or odd multiples of one-quarter wavelength from the free end of the support with the other end of the support secured to the unit being supported."

In the case of support 17, which is associated with a torsional-mode vibratory energy delivery member, impedance-matching torsional horn 5, dimensioning must additionally be in accordance with the required mode of vibration, i.e., the torsional mode, wherein for a given frequency of torsional vibration, $f_T$, the equation for wavelength $\lambda_T$ is $f_T = 1/2\lambda_T \sqrt{Q/2_\rho(\rho=1)}$ where $\lambda_T$ is one wavelength in torsion in centimeters, $\rho$ is the density of the material of construction in grams per cubic centimeter, Q is Young's modulus in dynes per square centimeter, and $\rho$ is Poisson's ratio.

One end of support 17 is metallurgically bonded to the outside diameter of impedance-matching torsional horn 5, preferably at an antinode or plane of maximum motion, and the other end of support 17 is free from attachment. Support 17 is provided with a radially outwardly extending flange 20 located one-quarter wavelength in torsion from its attachment end. In the illustrated embodiment, flange 20 is brazed or welded or otherwise fixedly secured within mounting sleeve 4, which may then be mounted to external means such as mounting base 11.

Should the overall length of the torsional assembly comprising torsional wave guide 2 and impedance-matching torsional horn 5 be such that additional support is required for flexural rigidity, a nodal-point support may be provided at the free end, as opposed to the vibratory energy delivery end, of said torsional assembly in the manner shown in the illustrated embodiment. Embracing collar 14 is preferably removably secured as by brazing to torsional wave guide 2 at radially outwardly extending flange 21, which is located at one-quarter wavelength in torsion or odd integral multiples of one-quarter wavelength in torsion from the free end 23 of torsional wave guide 2. Flange 21 is an integral part of torsional wave guide 2 or may be fixedly secured to torsional wave guide 2 as by brazing, welding, or the like. It is to be noted that the attachment between flange 21 and embracing collar 14 is preferably remote from the vibratory energy delivery locale (cutting tool 8) and from the locale where axial wave guide 9 is attached to torsional wave guide 2. The above-described device is adapted to apply torsional mode vibratory energy to the tool holder in a frequency range of about 10,000 to 75,000 cycles per second.

It should be evident that the device described hereinabove can be used for the machining of outside diameters as well as for the removal of material from an I.D. surface of a workpiece. However, the device was primarily conceived and designed for I.D. machining operations to meet a need that could not be provided by prior art devices.

For evaluation of the acoustical performance and the machining effectiveness, the device of FIG. 1 was installed on the cross slide of a Sebastian lathe, Model B-8. The lathe was equipped for accurate measurement of tool forces, turning speed, feed rate, and lathe power. For the initial checkout, the system was used to machine the outside diameter of 2024-T6 aluminum alloy and 1018 H.R. carbon steel. This arrangement permitted a more convenient measurement of tool forces than that afforded by an I.D. cut.

The aluminum alloy was machined at approximately 50 and 100 fpm, a feed rate of 0.008 ipr, and cut depths of 0.037 inch, 0.059 inch, 0.063 inch, and 0.163 inch, at ultrasonic power levels up to 600 electrical watts input to the transducers. The carbon steel was machined at about 50 and 100 fpm, a feed rate of 0.008 ipr, and cut depths of 0.0075 inch, 0.010 inch, 0.012 inch, and 0.025 inch. The initial diameter of both test metals was 3.52 inches. Both tool steel and carbide cutting tools were used in the evaluation cuts.

Figure 4:
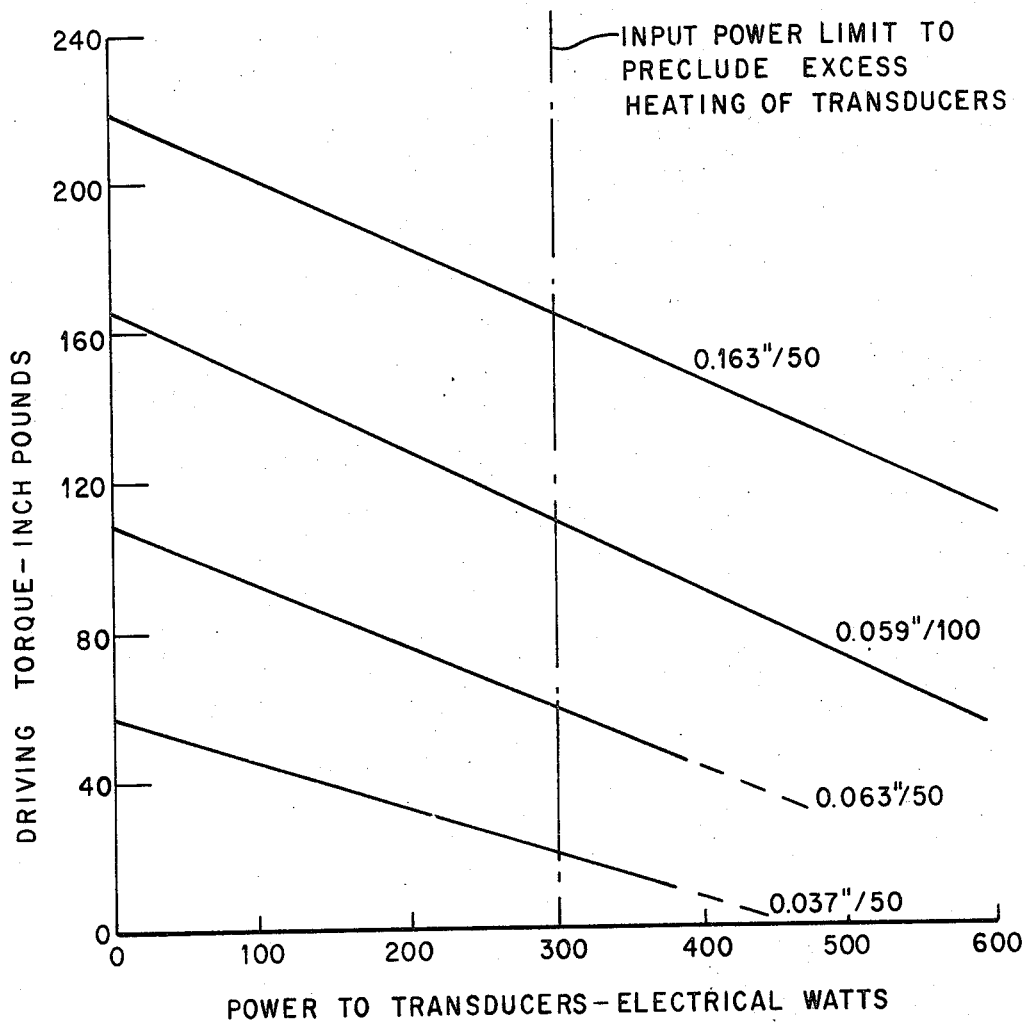

FIGS. 3 and 4 show the magnitude of the ultrasonic effect on machining 1018 H.R. carbon steel and 2024-T6 aluminum alloy, respectively, the reduction in drive torque for the aluminum alloy ranged from 56 percent at the lower metal removal rates to 21 percent at the higher metal removal rates. For the carbon steel, the reductions in drive torque ranged from 71 to 34 percent for low and high removal rates, respectively.

Visually, the ultrasonically machined surface exhibited a matte-like finish indicating a more complete shearing of the chips from the bulk material as opposed to a glossy surface resulting from tearing, material enfoldment, and burnishing which occur in conventional machining. The surface contour of ultrasonically machined specimens is observed to be smoother, with no evidence of the periodic waviness which is characteristic of conventionally machined specimens. Metallographic sections of the 1018 steel magnified 100X as shown in FIG. 5 exhibit the pronounced difference between the ultrasonic and the conventional cuts. The subsurface working effects resulting from conventional machining are evident in the plastic flow pattern; surface tearing is also apparent. In contrast, the ultrasonically machined surface is smoother and the mechanically disturbed near-surface layer is significantly more shallow than in the conventionally machined specimen.

Thus, it can be seen that the use of vibratory energy effectively coupled to a cutting tool to provide a combined torsional-flexural mode of operation insures that the vibratory movement of the cutting edge describes an arcuate path of radius which is less than the radius of the I.D. surface to be machined and at the same time insures that the quality of the cut can be improved and the forces on the cutting tool can be significantly reduced.

This invention has been described by way of illustration rather than limitation and it should be apparent that it is equally applicable in fields other than those described.

What is claimed is:

1. The method of removing material from an inside surface of a workpiece comprising the steps of supporting a cutting tool in a holder, supporting said holder in a machine tool, the improvement comprising applying torsional mode vibratory energy in a frequency range of about 10,000 to 75,000 cycles per second to said tool holder causing the cutting edge of said cutting tool to describe an arcuate path whose radius is less than the radius of the inside surface to be machined, and simultaneously providing relative rotational motion between said cutting tool and said workpiece while maintaining said cutting tool in contact with said inside surface.

2. Method in accordance with claim 1 wherein said cutting tool is supported at a location such that said cutting tool resonates flexurally.

* * * * *